United States Patent [19]

Matz

[11] 4,363,418
[45] Dec. 14, 1982

[54] KNIFE BLADE APPARATUS FOR SEVERING RUPTURE DISKS

[75] Inventor: Duane G. Matz, Broken Arrow, Okla.

[73] Assignee: BS&B Safety Systems, Inc., Tulsa, Okla.

[21] Appl. No.: 348,083

[22] Filed: Feb. 11, 1982

[51] Int. Cl.³ .......................................... F16K 17/40
[52] U.S. Cl. ............................. 220/89 A; 137/68 R; 220/319
[58] Field of Search .................. 137/68 R, 69, 70, 71; 220/266, 319, 89 A

[56] References Cited

U.S. PATENT DOCUMENTS

| | | | |
|---|---|---|---|
| 2,616,587 | 11/1952 | Petch | 220/319 X |
| 2,749,162 | 6/1956 | Humphrey | 220/319 X |
| 3,294,277 | 12/1966 | Wood | 220/89 A |
| 3,482,732 | 12/1969 | Davis | 220/89 A |
| 3,742,698 | 7/1973 | Kennedy | 137/68 R |
| 3,906,977 | 9/1975 | Summers et al. | 220/89 A X |
| 4,085,764 | 4/1978 | Raidl, Jr. | 220/89 A X |
| 4,119,236 | 10/1978 | Shaw et al. | 220/89 A |
| 4,195,632 | 4/1980 | Parker et al. | 137/68 R X |

FOREIGN PATENT DOCUMENTS

| | | | |
|---|---|---|---|
| 1145881 | 3/1963 | Fed. Rep. of Germany | 137/68 R |
| 1174200 | 7/1964 | Fed. Rep. of Germany | 137/68 R |

*Primary Examiner*—Joseph Man-Fu Moy
*Assistant Examiner*—Gary E. Elkins
*Attorney, Agent, or Firm*—Laney, Dougherty, Hessin & Beavers

[57] ABSTRACT

An improved knife blade apparatus adapted to be installed in a rupture disk assembly whereby upon failure of a rupture disk in the assembly the disk is severed by the knife blade apparatus. The apparatus includes an annular support member adapted to be installed in the assembly having an annular groove disposed interiorly therein, knife blades disposed interiorly of the support member including one or more exterior portions each of which includes a groove therein, and an annular snap ring disposed in the annular groove in the support member and in the grooves in the one or more exterior portions of the knife blades whereby the knife blades are held within the support member but are free to expand or contract therein.

11 Claims, 6 Drawing Figures

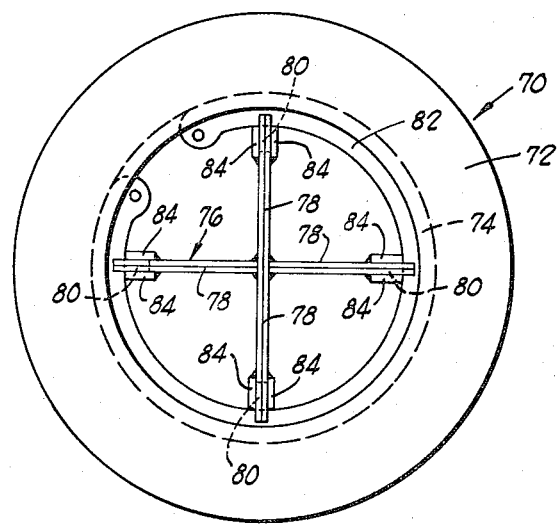
FIG. 3
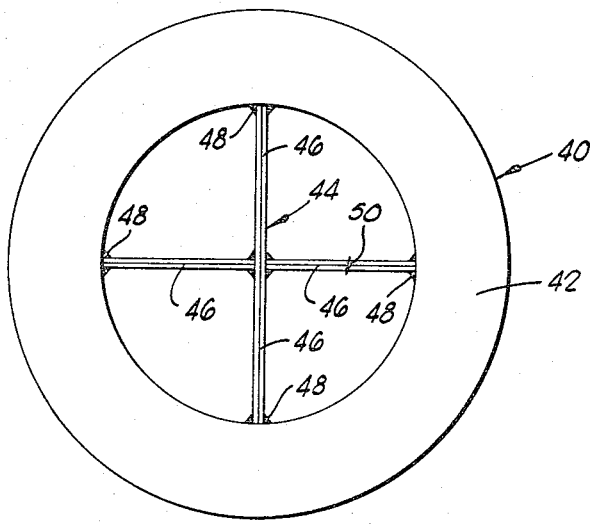
FIG. 4
FIG. 5 (PRIOR ART)
FIG. 6 (PRIOR ART)

KNIFE BLADE APPARATUS FOR SEVERING RUPTURE DISKS

BACKGROUND OF THE INVENTION

1. Field of the Invention

The present invention relates to improved knife blade apparatus for severing rupture disks, and more particularly, but not by way of limitation, to an improved knife blade apparatus adapted to be installed in a reverse buckling rupture disk assembly.

2. Description of the Prior Art

Rupture disk assemblies which include reverse buckling rupture disks and knife blades have been developed and used heretofore. In operation of such an assembly, when the reverse buckling rupture disk reverses itself, it impales on the knife blades and is severed whereby full opening of the rupture disk without fragmentation is achieved.

A number of reverse buckling rupture disk assemblies having various parts and arrangements of such parts have been heretofore developed and used, but most of such assemblies utilize knife blades formed of at least three knife blade legs attached within the interior of the outlet rupture disk support member and positioned across the opening in said support member. For example, U.S. Pat. No. 3,294,277 issued to Wood on Dec. 27, 1966 and assigned to the assignee of the present invention discloses a reverse buckling rupture disk assembly including knife blade apparatus of the type described above. Another example of such an assembly is shown in U.S. Pat. No. 4,119,236 issued to Shaw et al. on Oct. 10, 1978.

In most of the heretofore developed rupture disk assemblies utilizing knife blades, the knife blade means are comprised of four sharpened blade legs of equal length having the interior ends thereof connected together at right angles and having the exterior ends welded to the interior of an annular rupture disk support member. In applications of rupture disk assemblies including such knife blade apparatus wherein the fluids relieved through the assemblies upon failure of the rupture disks thereof are extremely cold, cool upon expansion or are extremely hot, a problem has been encountered involving the breaking or cracking of the knife blade apparatus. That is, when the rupture disk in such an assembly ruptures and is severed by the knife blade means, cold fluid flowing through and being relieved by the rupture disk assembly quickly cools the knife blade means disposed in the outlet support member of the assembly causing the knife blade means to contract. Because, heretofore, the knife blade means have been rigidly attached to the outlet support member or to a secondary member which is rigidly held in the assembly, the knife blade means often crack, either in one or more of the blade legs or in one or more of the welds at the points of attachment of the blade legs to the support member. The rapid expansion of the knife blade means when contacted with hot fluid can also cause cracking or other damage to the knife blade means. Once cracked or otherwise damaged, the knife blade means and support member to which they are attached cannot be reused making the often frequent and expensive replacement of such apparatus necessary.

By the present invention an improved knife blade apparatus adapted to be installed in a rupture disk assembly is provided whereby failure of the knife blade apparatus due to the expansion or contraction thereof is obviated.

SUMMARY OF THE INVENTION

An improved knife blade apparatus adapted to be installed in a rupture disk assembly whereby upon failure of a rupture disk in the assembly the disk is severed by the knife blade apparatus comprising an annular support member adapted to be installed in the assembly including an annular groove disposed interiorly therein, knife blade means disposed interiorly of the support member including one or more exterior portions each of which includes a groove therein complementary to and positioned adjacent the interior of the support member and the annular groove disposed therein and an annular snap ring disposed in the annular groove in the support member and in the groove in the one or more exterior portions of the knife blade means whereby the knife blade means are held within the support member but are not rigidly attached thereto.

It is, therefore, a general object of the present invention to provide an improved knife blade apparatus for severing rupture disks.

A further object of the present invention is the provision of an improved knife blade apparatus adapted to be installed in a rupture disk assembly whereby problems associated with the cracking of the knife blade apparatus due to rapid increases or decreases in the temperature of the apparatus are obviated.

Yet a further object of the present invention is the provision of improved knife blade apparatus adapted to be installed in a reverse buckling rupture disk assembly wherein knife blade means are held within the interior of an annular rupture disk support member without being rigidly attached thereto whereby cracking or breaking of the knife blade means upon the rapid temperature change thereof is prevented.

Other and further objects, features and advantages of the present invention will be readily apparent to those skilled in the art upon a reading of the brief description of preferred embodiments which follows when taken in conjunction with the accompanying drawings.

BRIEF DESCRIPTION OF THE DRAWINGS

FIG. 3 is a side cross-sectional view of an alternate form of the improved knife blade apparatus of the present invention.

FIG. 4 is a top view of the apparatus of FIG. 3 taken along line 4—4 of FIG. 3.

FIG. 5 is a cross-sectional view of a typical knife blade apparatus of the prior art.

FIG. 6 is a top view of the apparatus of FIG. 5 taken along line 6—6 thereof.

DESCRIPTION OF PREFERRED EMBODIMENTS

Figure 1:
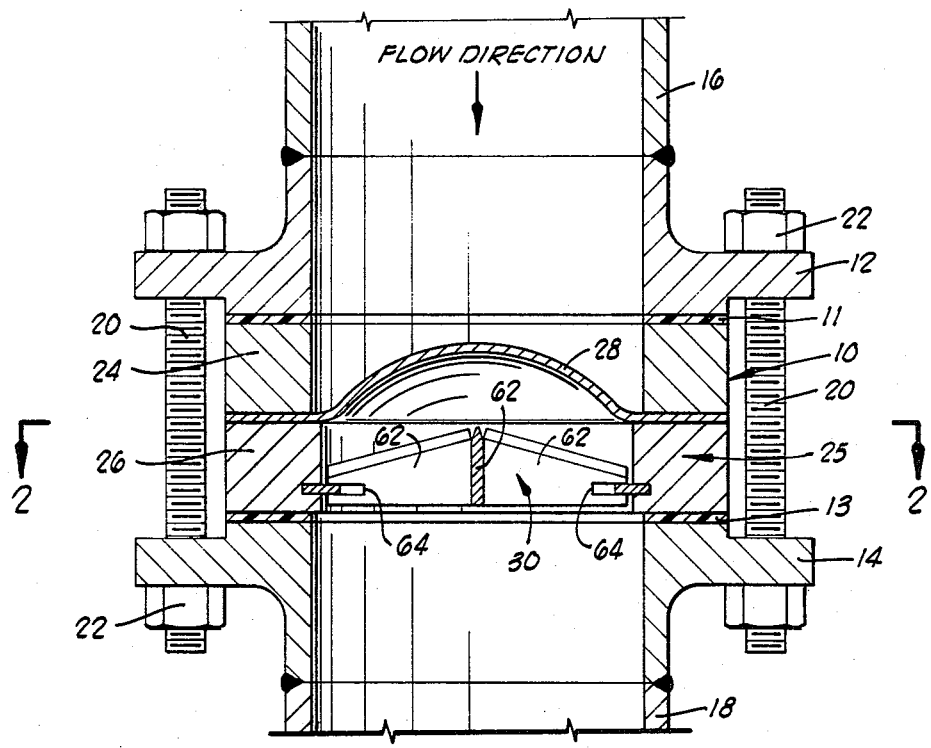
FIG. 1 is a side cross-sectional view of a reverse buckling rupture disk assembly including the improved knife blade apparatus of the present invention clamped between a pair of companion flanges.
Figure 2:
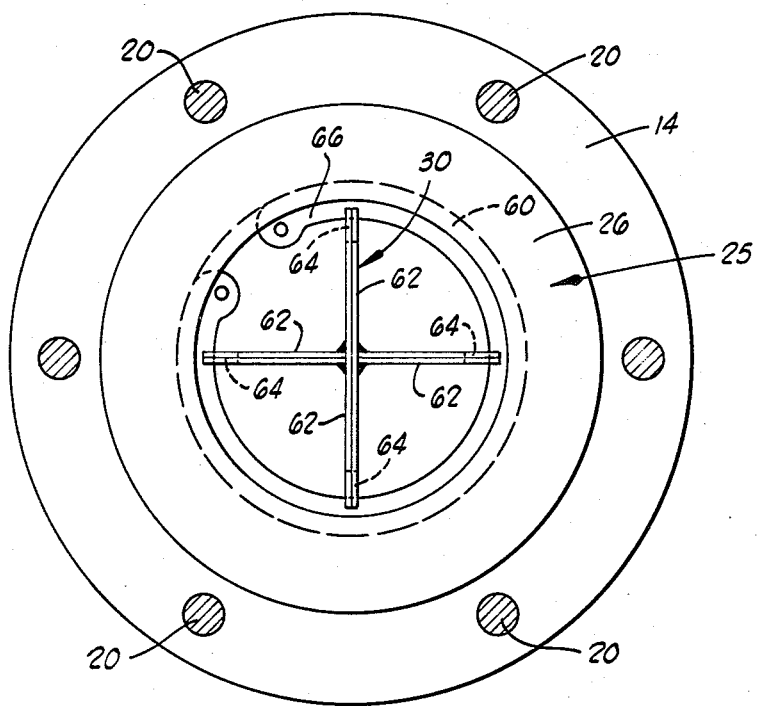
FIG. 2 is a cross-sectional view of the assembly of FIG. 1 taken along line 2—2 of FIG. 1.

Referring now to the drawings and particularly to FIGS. 1 and 2, a reverse buckling rupture disk assembly including the improved knife blade apparatus of the present invention is illustrated and generally designated by the numeral 10. The assembly 10 is shown clamped between a pair of companion inlet and outlet flanges 12 and 14, respectively, which are in turn attached to inlet and outlet conduits 16 and 18, respectively. As is well understood by those skilled in the art, the inlet conduit 16 is connected to a vessel or system containing fluid under pressure whereby such pressure is communicated to the rupture disk assembly 10. When the pressure exerted on the rupture disk assembly 10 exceeds the predetermined design rupture pressure thereof, the rupture disk assembly opens whereby fluid pressure is relieved through the assembly and led to the atmosphere or to another vessel or system for receiving relieved fluids by the conduit 18.

The rupture disk assembly 10 and conventional gaskets 11 and 13 are clamped between the flanges 12 and 14 by a plurality of studs 20 and nuts 22 positioned in openings around the peripheries of the flanges. The assembly 10 is comprised of an annular inlet support member 24, the knife blade apparatus of the present invention 25 which includes an annular outlet support member 26, and a reverse buckling rupture disk 28 positioned therebetween. The knife blade apparatus 25 includes knife blade means 30 positioned within the interior of the support member 26 whereby upon failure of the rupture disk 28, i.e., the reversal thereof due to excess fluid pressure being exerted thereon, the rupture disk 28 contacts the knife blade means 30 and is severed thereby allowing fluids under pressure to be relieved through the assembly 10. As mentioned above, the rupture disk assembly 10 can take various other forms, e.g., more than one rupture disk can be utilized in the assembly, and the support members 24 and 26 can take various other forms.

Refering now to FIGS. 5 and 6, the most commonly used prior art knife blade apparatus is illustrated and generally designated by the numeral 40. The apparatus 40 includes an annular rupture disk support member 42 adapted to be installed in a rupture disk assembly of the type illustrated in FIGS. 1 and 2 with knife blade means, generally designated by the numeral 44, welded to the interior thereof. The knife blade means 44 are comprised of four sharpened blade legs 46, the interior ends of which are welded together at right angles to each other and the exterior ends of which are welded to the interior of the annular support member 42. The sharpened blade legs 46 are positioned across the opening in the support member 42 and the apparatus 40 is installed in a rupture disk assembly whereby the sharpened portions of the blade legs 46 face the rupture disk to be severed thereby.

As described above, in use of the knife blade apparatus 40 in a rupture disk assembly installed in an application wherein hot or cold fluids are relieved through the rupture disk assembly upon the failure of the rupture disk, the hot or cold fluid flows over and past the knife blade legs 46 causing them to be rapidly heated or cooled. This rapid heating or cooling of the knife blade legs 46 causes the legs to expand or contract within the support member 42 whereby the legs 46 and/or the welds 48 between the legs 46 and the support member 42 are cracked. For example, in applications where the knife blade means 44 are rapidly cooled, a crack 50 is often formed in one or more of the blade legs 46 and/or one or more of the welds 48 are cracked or broken.

Referring again to FIGS. 1 and 2, the improved knife blade apparatus 25 of the present invention obviates damage of the type described above. More specifically, the annular outlet support member 26 of the apparatus 25 includes an annular groove 60 disposed interiorly thereof, preferably lying in a plane parallel to the side of the support member 26 adjacent the rupture disk 28. While the knife means 30 held within the interior of the support member 26 can take various forms, it generally includes at least three sharpened blade legs of equal length connected together at the interior ends thereof with the exterior ends being spaced apart and extending to positions adjacent the interior of the support member 26 and the annular groove 60 therein. In the most preferred form, the knife blade means 30 includes four sharpened blade legs 62 of equal length welded or otherwise connected together at the interior ends thereof at right angles to each other, the sharpened portions of the blade legs all facing in the same direction, i.e., facing the rupture disk 28. The exterior ends of each of the blade legs 62 are positioned adjacent the interior of the support member 26 and the annular groove 60 disposed therein, and a groove 64 which is complementary to and positioned adjacent the annular groove 60 of the support member 26 is disposed in the exterior end of each of the blade legs 52. Disposed within the annular groove 60 of the support member 26 and the grooves 64 in the exterior ends of the blade legs 62 is an annular manually contractable snap ring 66. The contractable snap ring 66 is of conventional design well understood by those skilled in the art which can be contracted using conventional tools to a diameter less than the diameter of the interior opening in the support member 26 during the installation of the knife blade means 30 and the snap ring 66 therein. When the knife blade means 30 with the snap ring 66 contracted into the grooves 64 thereof is positioned adjacent the annular groove 60 in the support member 26, the snap ring 66 is allowed to expand into the annular groove 60 whereby portions of the snap ring are disposed within both the annular groove 60 and the grooves 64 thereby holding the knife blade means 30 within the interior of the support member 26.

Because the grooves 60 and 64 of the support member 26 and knife blade means 30 and the snap ring 66 disposed within such grooves hold the knife blade means 30 within the interior of the support member 26 but do not rigidly attach the knife blade means 30 thereto, the expansion and/or contraction of the knife blade means 30 does not result in the type of damage thereto described above. That is, the snap ring and grooves prevent the knife blade means 30 from moving axially within the annular support member 26, but allow the knife blade means 30 and the blade legs 62 thereof to move in directions perpendicular to the axis of the support member 26, i.e., the blade legs 62 are free to expand and/or contract. The use of the snap ring 66 also allows the convenient removal of the knife blade means 30 from the support member 26 and the replacement thereof without replacing the support member 26.

Referring now to FIGS. 3 and 4, an alternate form of the knife blade apparatus of the present invention is illustrated and generally designated by the numeral 70. Like the knife blade apparatus 25 described above, the knife blade apparatus 70 includes an annular support member 72 having an annular groove 74 disposed in the interior thereof. Knife blade means, generally designated by the numeral 76, are disposed within the interior of the support member 72. The knife blade means 76 include at least three and preferably four sharpened blade legs 78 of equal length connected together at their interior ends whereby the exterior ends are spaced apart from each other. The exterior ends of the blade legs 78 include grooves 80 complementary to and positioned adjacent the interior of the support member 72 and the annular groove 74 therein. An annular contratable snap ring 82 is disposed in the annular groove 74 of the support member 72 and the grooves 80 of the blade legs 78 thereby holding the knife blade means 76 within the interior of the support member 72 without the knife blade means 76 being rigidly attached thereto. A pair of stiffener plates 84 are welded on opposite sides of each of the blade legs 78 at the exterior end portions thereof with the exterior ends of the stiffener plates 84 being positioned over portions of the grooves 80 in the blade legs 7. When used, the stiffener plates 84 are welded onto the blade legs 78 after the knife blade means 76 and snap ring 82 have been installed within the interior of the support member 72. The stiffener plates 84 stiffen the exterior end portions of the blade legs 78 whereby the grooves 84 therein are reinforced. In addition, the positioning of the stiffener plates 84 over the interior portions of the grooves 80 in the blade legs 78 prevent the snap ring 82 from being removed after the stiffener plates 84 are installed which in turn prevents a user of the knife blade apparatus 70 from installing the apparatus in a rupture disk assembly without the knife blade means 76. As will be understood, the addition of the stiffener plates 84 to the apparatus 70 is optional, and generally, the stiffener plates 84 are used only where the apparatus 70 is to be installed in a rupture disk assembly wherein the rupture disk is relatively thick and places a force of large magnitude on the knife blade means when the disk reverses itself and is severed by the knife blade means. The placement of the stiffener plates 84 is such that the knife blade means 76 can still move in directions perpendicular to the axis of the support member 72 whereby expansion and/or contraction of the knife blade means does not cause damage thereto.

Thus, the improved knife blade apparatus of the present invention and rupture disk assemblies including the apparatus are not damaged as a result of the expansion and/or contraction of the knife blade means and make the replacement of the knife blade means without the replacement of the support member associated therewith possible. In addition, the use of grooves and a snap ring to attach the knife blade means to the support member is generally more economical than welding the knife blade means to the support member.

While numerous changes in the construction and arrangement of parts of the apparatus of the present invention will suggest themselves to those skilled in the art, such changes are encompassed within the spirit of this invention as defined by the appended claims.

What is claimed is:

1. An improved knife blade apparatus adapted to be installed in a rupture disk assembly whereby upon failure of a rupture disk in the assembly, the disk is severed by the knife blade apparatus comprising:
   an annular support member adapted to be installed in said assembly, said support member including an annular groove disposed interiorly therein;
   knife blade means disposed interiorly of said support member, said knife blade means including one or more exterior portions each of which includes a groove therein complementary to and positioned adjacent the interior of said support member and the annular groove disposed therein; and
   an annular snap ring disposed in said annular groove in said support member and in said grooves in said one or more exterior portions of said knife blade means whereby said knife blade means are held within the interior of said support member but are not rigidly attached thereto.

2. The apparatus of claim 1 wherein said knife blade means include at least three sharpened blade legs the interior ends of which are connected together and the exterior ends of which are spaced apart, the exterior ends each including a groove disposed therein complementary to and positioned adjacent the interior of said support member and the annular groove therein.

3. The apparatus of claim 1 wherein said knife blade means are comprised of four sharpened blade legs of equal length, the interior ends of said legs being connected together with the exterior ends thereof including grooves disposed therein complementary to and positioned adjacent the interior of said support member and the annular groove disposed therein.

4. An improved knife blade apparatus adapted to be installed in a rupture disk assembly whereby upon failure of a rupture disk in the assembly, the disk is severed by the knife blade apparatus comprising:
   an annular support member adapted to be installed in said assembly with one side thereof facing a rupture disk in said assembly, said support member including an annular groove disposed interiorly therein lying in a plane parallel to the side thereof facing said rupture disk;
   knife blade means disposed interiorly of said support member including at least three sharpened blade legs of equal length having the interior ends thereof connected together with the sharpened portions thereof facing said rupture disk in said assembly and having the exterior ends thereof positioned in spaced relationship to each other adjacent the interior of said support member, each of the interior ends of said blade legs including a groove disposed therein complementary to and positioned adjacent said annular groove in said support member; and
   an annular snap ring disposed in said annular groove in said support member and in said grooves in the exterior ends of said blade legs whereby said knife blade means are held within the interior of said support member but are not rigidly attached thereto.

5. The apparatus of claim 4 wherein said knife blade means include four sharpened blade legs having the interior ends thereof connected together at right angles to each other.

6. The apparatus of claim 5 wherein said knife blade means are further characterized to include at least one stiffener plate attached to each of said blade legs at exterior end portions thereof.

7. A rupture disk assembly including a rupture disk and a knife blade apparatus for severing the rupture disk upon the falure thereof comprising:
   a rupture disk having an annular exterior flange portion;
   an inlet annular support member having a seating surface for sealingly engaging one side of the annular flange portion of said rupture disk;
   a knife blade apparatus having an annular seating surface for sealingly engaging the other side of the annular flange portion of said rupture disk, said knife blade apparatus comprising:
      an outlet annular support member having an annular seating surface for sealingly engaging said rupture disk and having an annular groove disposed interiorly therein;

knife blade means disposed interiorly of said support member, said knife blade means including one or more exterior portions each of which includes a groove therein complementary to and positioned adjacent the interior of said support member and the annular groove disposed therein; and an annular snap ring disposed in said annular groove in said support member and in said grooves in said one or more exterior portions thereof whereby said knife blade means are held within the interior of said support member but are not rigidly attached thereto.

8. The rupture disk assembly of claim 7 wherein said knife blade means include at least three sharpened blade legs, the exterior ends of which are spaced apart and include grooves disposed therein complementary to and positioned adjacent the interior of said support member and the annular groove therein.

9. The rupture disk assembly of claim 7 wherein said knife blade means are comprised of four sharpened blade legs of equal length, the interior ends of said blade legs being connected together at right angles to each other with the exterior ends thereof including grooves disposed therein complementary to and positioned adjacent the interior of said support member and the annular groove disposed therein.

10. The rupture disk assembly of claim 9 wherein said rupture disk is a reverse buckling rupture disk.

11. The rupture disk assembly of claim 10 wherein said inlet and outlet support members are adapted for being sealingly clamped between a pair of complementary flanges.

* * * * *